United States Patent [19]

Alves

[11] Patent Number: 4,499,597
[45] Date of Patent: Feb. 12, 1985

[54] SMALL-OBJECT LOCATION UTILIZING CENTROID ACCUMULATION

[75] Inventor: James F. Alves, Chatsworth, Calif.

[73] Assignee: Hughes Aircraft Company, El Segundo, Calif.

[21] Appl. No.: 363,318

[22] Filed: Mar. 29, 1982

[51] Int. Cl.³ .............................................. G06K 9/52
[52] U.S. Cl. ...................................... 382/41; 364/554; 382/27; 382/48; 382/54
[58] Field of Search ...................... 382/27, 41, 54, 48; 358/107, 160, 282, 284; 364/724, 725, 554

[56] References Cited

U.S. PATENT DOCUMENTS 3,274,549  9/1966  Moskowitz ............................ 382/41
3,292,148  12/1966  Giuliano et al. ....................... 382/41
4,398,256  8/1983  Nussmeier et al. .................... 382/41

Primary Examiner—Leo H. Boudreau
Attorney, Agent, or Firm—W. J. Benman, Jr.; A. W. Karambelas

[57] ABSTRACT

In the disclosed image-analysis scheme, a processing window of M by N pixels is successively scanned in single-pixel steps over a sensed image, with the centroid of the image data contained in each window position then being determined. When a pixel-by-pixel tabulation is made of the number of times each pixel has been determined to be the windowed-data centroid, those pixels having the higher tabulated centroid counts will tend to be the intra-image locations of any objects which are smaller than about M/2 by N/2 pixels.

4 Claims, 8 Drawing Figures

SMALL-OBJECT LOCATION UTILIZING CENTROID ACCUMULATION

BACKGROUND OF THE INVENTION

1. Field of the Invention

The invention relates in general to image processing and in particular to a technique for locating small objects in a given field of view.

2. Description of the Prior Art

Encompassed within two relevant categories of prior art are centroiding techniques on one hand and image-analysis techniques on the other.

Although centroiding is a well-known mathematical operation which has been extensively used in imaging-tracker systems, such use has typically been limited to aim-point updating. That is, centroiding has ordinarily been utilized only for precision offset-analysis in which the centroid of an isolated image of a target whose location has already otherwise been generally ascertained is computed and positionally compared with the centroid of a reference image. Centroiding has not typically been employed to analyze entire scenes for the initial locating of targets of interest.

Furthermore, those prior-art procedures which have in fact been used for composite-scene analysis have generally consisted of cumbersome routines not readily adaptable for locating small objects in a given field of view. Although considerable effort has been expended in diverse attempts to achieve an efficient, small-target-location capability, the prior efforts have failed to produce an image-analysis scheme of this nature which is not only practical but also fully effective in a real-time environment with respect to a wide variety of objects and image conditions.

SUMMARY OF THE INVENTION

It is an aim of this invention, therefore, to provide an image-analysis technique which is capable of ascertaining both the presence and location of small objects in an entire-scene image.

It is also an aim of this invention to provide a technique which is capable of performing such determinations efficiently in real-time.

It is a further aim of this invention to provide a technique which continues to provide these determination capabilities even with respect to a wide variety of objects, image conditions and image content.

These and other aims are achieved by the disclosed invention which in one of its aspects causes a processing window to be step-wise scanned over a sensed, pixel-based image, with the centroid pixel of each set of image data successively contained within the scanning window being determined, and with a tabulation being made of the number of times each image pixel is thusly determined to be the windowed-data centroid. As a net result, those pixels having the higher tabulated centroid counts will be the intra-image locations of small objects contained within the scene.

BRIEF DESCRIPTION OF THE DRAWINGS

These and other aims and advantages will become apparent from a study of the following specification when considered in conjunction with the accompanying drawings in which.

Figure 1:
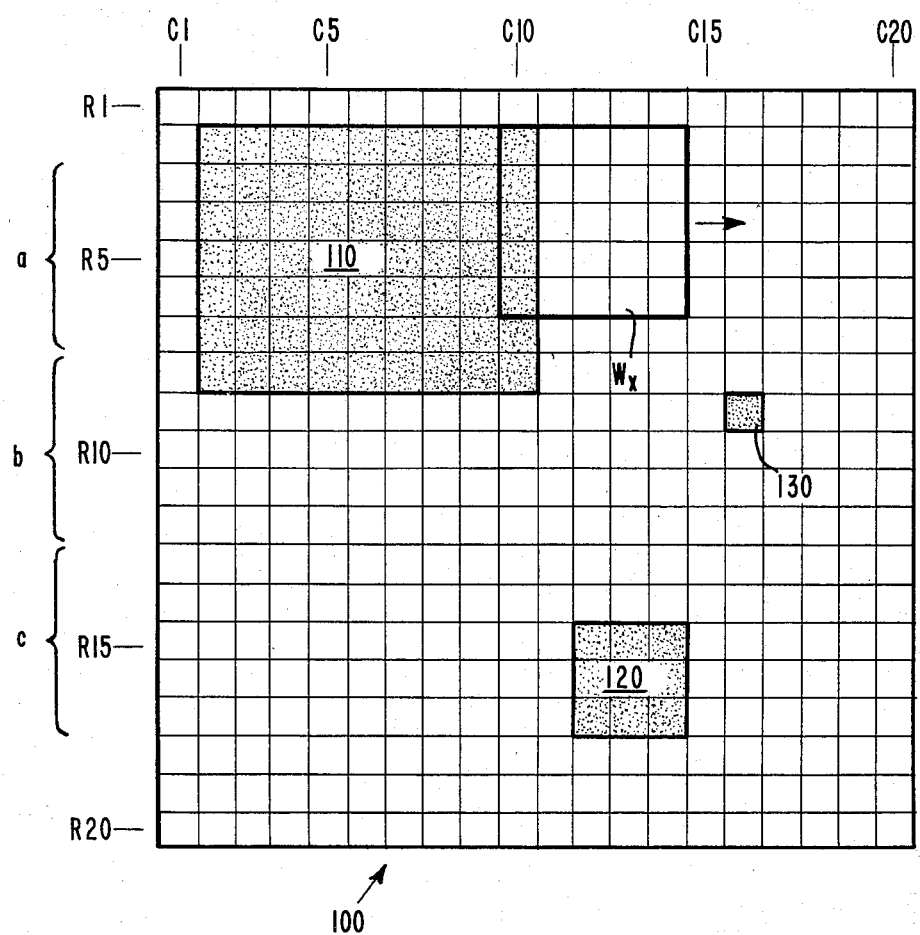
FIG. 1 shows in simplified schematic form an example image in which the location of any small objects is to be determined.
Figure 4A:
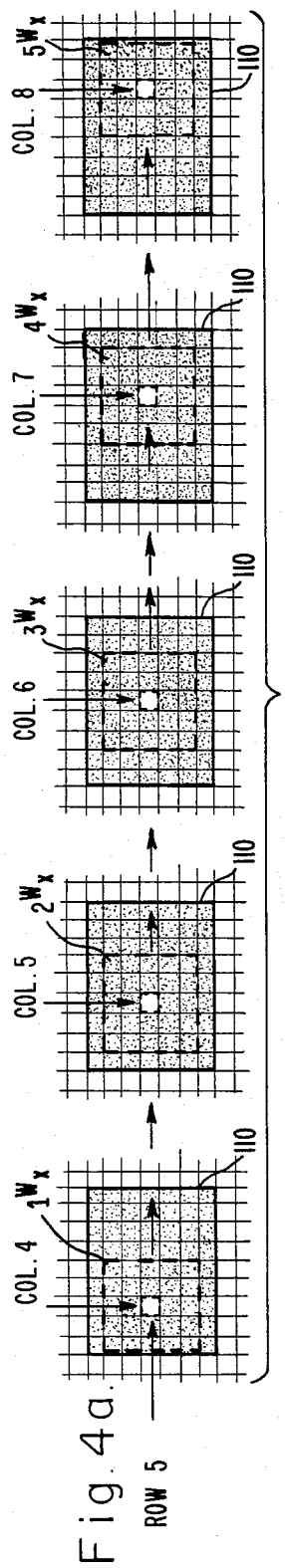
Figure 4B:
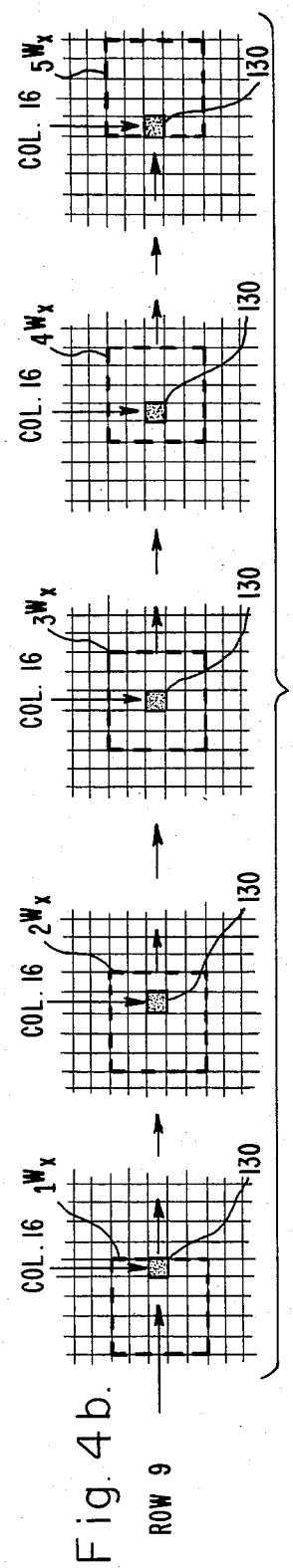
Figure 4C:
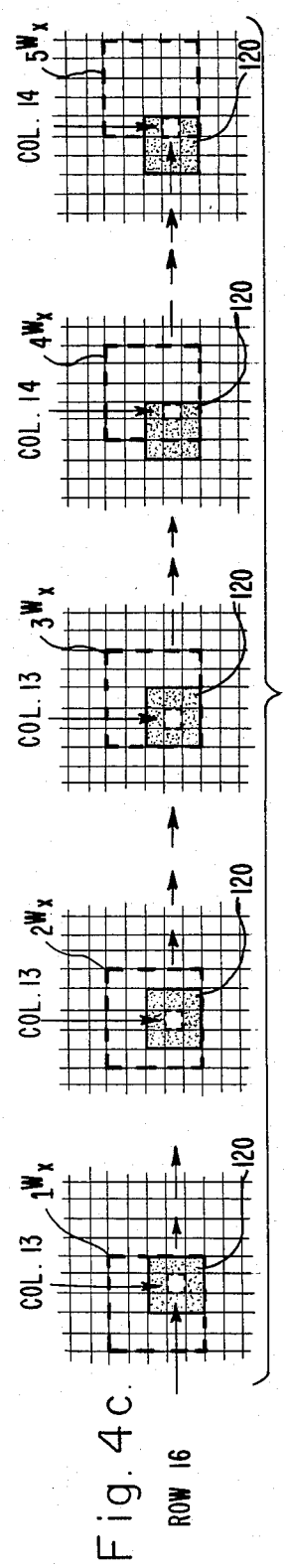
Figure 5:
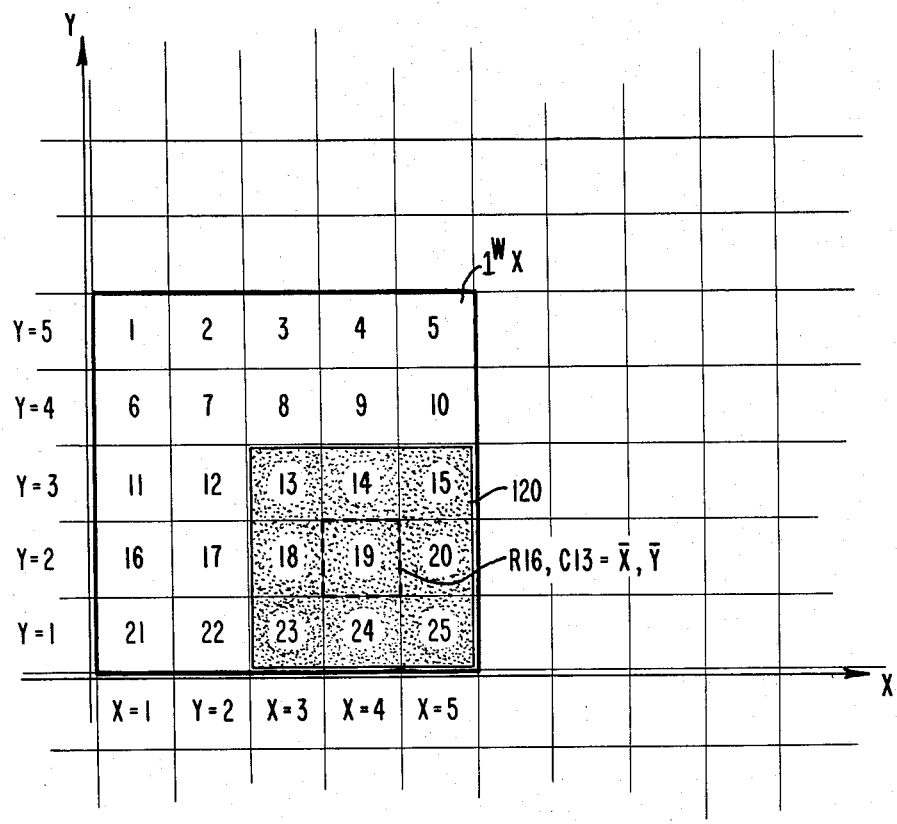
Figure 6:
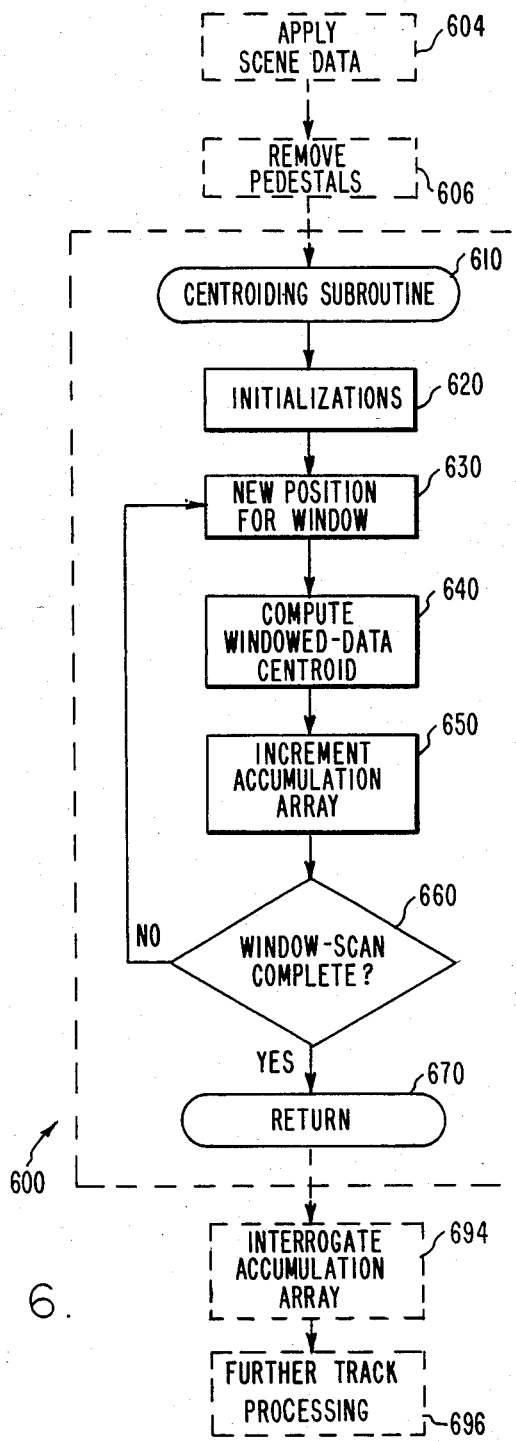

The three rows of image sections respectively presented in FIGS. 4a, 4b and 4c show a sequence of successive horizontal window positions as the analysis window scans over the three objects which appear in the image of FIG. 1;

FIG. 5 illustrates various aspects of a windowed-data centroiding calculation;

In FIG. 6 is displayed a generalized flow chart of an example computer program which implements the basic centroid-accumulation technique of the present invention.

DETAILED DESCRIPTION OF THE INVENTION

I. Overview

A. Operational Environment

In FIG. 1 is presented in simplified schematic form an example sensed image 100 such as may be obtained from a given field of view by means of conventional sensing and imaging devices. Within this scene appear the large, intermediate, and small-sized objects, respectively consisting of factory 110, house 120 and automobile 130. The basic purpose of the invention is to automatically determine whether small objects are present in the sensed scene and, if so, what their intra-scene locations are. With respect to the objects appearing in image 100, it is thus generally desired to ascertain the presence of, as well as the location of, automobile 130, while distinguishing the large-sized factory 110 and the intermediately-sized house 120.

(It may be noted parenthetically that the schematic objects of the simplified scene will be regarded both as being isolated bright spots of uniform, unit-value image intensity and as being surrounded by a zero-intensity background.)

As is well known, images such as scene 100 are typically composed of a plurality of picture elements called pixels, with the component pixels being arranged into a plurality of lines, and with each line being in turn composed of a plurality of pixels. In image 100, these lines are labeled as rows R1 through R20, each of which has 20 pixels. Similarly-situated pixels in the successive lines form columns C1 through C20. Any of the individual pixels in image 100 may then be conveniently identified by a unique row and column designation. For example, automobile 130 may be seen to be located at the intersection pixel of row 9 and column 16. This pixel is given the symbolic designation of {R9, C16}.

B. Operational Synopsis

Shown superimposed on a portion of scene 100 is processing window $W_x$. In practicing the invention, window $W_x$ is typically scanned over the entire image in a raster-like, step-wise combination of single-column and single-row increments. At each window position, a determination is made as to which of the enclosed pixels coincides with the centroid of whatever objects (i.e., image data) or portions of objects are contained there within the window.

For example, with window $W_x$ in its depicted position enclosing the 5-pixel-by-5-pixel array of pixels {R2, C10} through {R2, C14} to {R6, C10} through {R6, C14}, the factory-110 segment which occupies the column-10 pixels from $R_2$ through R6 falls within the window. It may readily be demonstrated that the centroid of this window-enclosed object segment coincides with image pixel {R4, C10}.

Following this ascertainment of the centroid pixel, a centroid count for the ascertained pixel is incremented in an accumulating count-storage array whose purpose is to tabulate the number of times each pixel in the image has been determined to be a data centroid of the scanning window. Because a separate count must be kept for each of the pixels, the utilized tabulation array will generally have as many count-storage elements as there are pixels in the image being analyzed. Thus with respect to the factory-segment example begun above, the centroid processing at the $W_x$ window position as shown in FIG. 1 would result in a centroid count increment for the storage element corresponding to pixel {R4, C10}.

As will be further described below, once the window has been scanned over the entire image and the resulting per-window-position centroid locations have been determined and accumulated, the pixels corresponding to those count-array positions having high count-accumulations will be the intra-image locations of small-sized objects.

II. Basic Operational Principles

Figure 2:
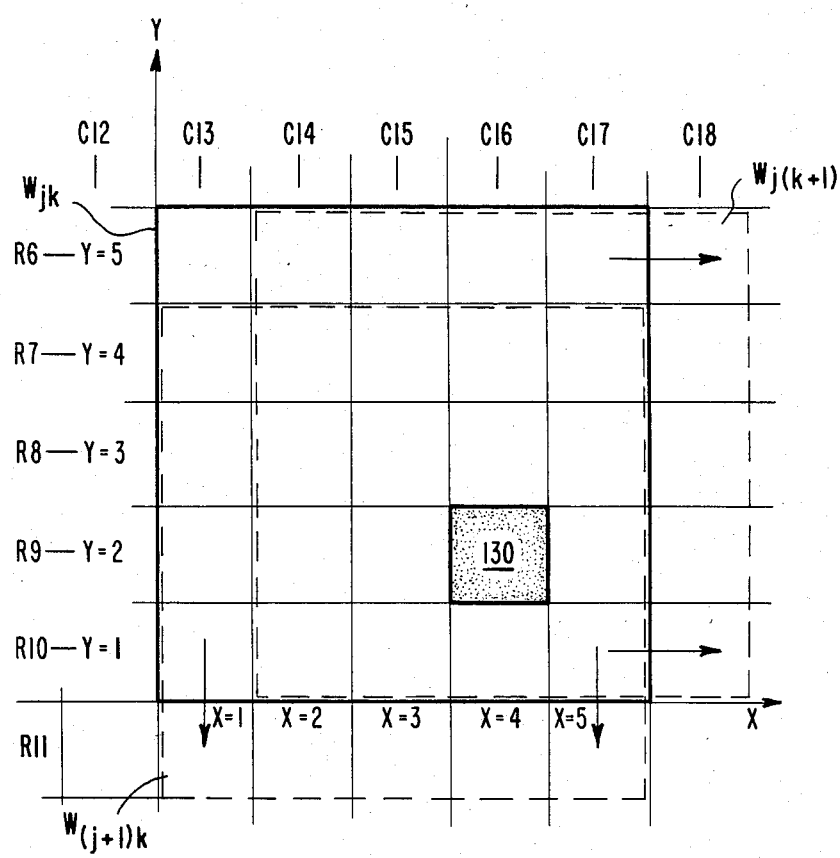
FIG. 2 illustrates the concept of the scanning analysis window which is shifted in single-pixel steps horizontally and vertically over the sensed image, as is required in accordance with the invention.

With reference to FIG. 2, fundamental aspects of the invention will now be further discussed.

A. Processing Window

1. Formation

The more-specific nature of the processing window may be better understood by examining the means conventionally utilized for assembling a composite scene such as image 100. Typically, the sensed scene-data of individual pixels is read into a storage array which has an individual and unique storage position for the data of each pixel in the image. A statement that the processing window has been placed at a given position in the image may be regarded as being in the nature of a term of art which refers to the more concrete operation of utilizing gating networks to read out of memory the ordered image data for each one of that set of pixels which is enclosed within the perimeter of the window as positioned. The ensuing processing is then performed on that data set as a unit.

Consider, for example, the situation presented in FIG. 2. The figure shows the processing window in the vicinity of the small automobile target 130 which appears in image 100 of FIG. 1. Designated as "$W_{jk}$" is the window located in position "jk," where "j" is a generalized index related to the particular set of rows at which the window is positioned, while "k" is the analogous index with respect to the associated columns. For $W_{jk}$ as shown, the subject rows are seen to be R6 through R10, while the associated columns are C13 through C17. The windowing of this set of rows and columns means that there will be read out of the image-data memory the ordered contents of those storage positions which hold the image-data values of pixels {R6, C13} through {R6, C17} to {R10, C13} through {R10, C17}. The centroiding operation which then follows is performed with respect to the data values of this windowed/memory-gated set of pixels.

2. Window Dimensioning

In generalizing the description of the size of a given processing window, it becomes convenient to specify the window's width and height as respectively being M and N pixels in extent. In an actual operational environment, the sizing dimensions M and N would be tailored according to several considerations.

The first consideration is that of the relative size of a small object of interest as it may be expected to appear within a sensed scene. Intra-scene size is an important window-sizing consideration as an inherent consequence of the nature of the inventive-object-location technique. It will become apparent from example scene-analysis situations presented below that the subject technique may be regarded as being of enhanced effectiveness with respect to objects whose intra-scene size is smaller than about M/2 by N/2. Furthermore, it will likewise become apparent that in general the greater the differential between the (M/2)-by-(N/2) window area and the intra-scene area of a desired object, the more pronounced the small-size-location capability will become.

As is well known, intra-scene size will be a function not only of the desired object's absolute size but also of sensor-versus-scene geometry. In addition to optics and imaging mechanics, the distance between the sensor and the sensed scene is a principal element of the sensor-versus-scene geometry and is hence a factor which has an important effect on a desired object's intra-scene size. Furthermore, in dynamic operational situations where there is expected to be relative motion between the sensor and the scene, the window dimensions would during the course of operation (although not during the processing of a given single scene) be adaptively adjusted to accommodate the consequentially-varying size of the type of object to be detected. It will be apparent that the window may also be dynamically altered where at different times it is desired to locate different types of objects having among themselves different relative sizes.

The second of the considerations which can have an important influence on window dimensioning is the desired object's perceived shape. If a given object is likely to have a known, fixed orientation and will be perceived from the perspective of the sensor as being generally rectangular as opposed to either square or circular, a rectangular window may prove to be more appropriate to the achievement of the desired size discrimination than simply a square window of the type utilized for illustrative purposes throughout this specification. Thus with reference to the above discussion concerning the invention's often maximal effectiveness with respect to targets whose intra-scene size is less than about M/2 by N/2 in the case of an M-by-N window, it becomes possible, in many situations involving rectangular, fixed-orientation objects of image size R by S, to specify that the optimum window size be at least 2R by 2S.

In many operational situations, however, it will not be sufficient to adjust window dimensions solely according to a given object's scene size. In addition, therefore, to the above-discussed window-sizing factors, there at times exist countervailing considerations which limit the extent to which the inventive size-discrimination capability may be optimized through dimensional increases for the purpose of obtaining the largest possible differential between window area and an object's occupied scene area.

A first set of countervailing considerations may be given the generic designation of "clutter." The general problem here is that the presence within the window of extraneous imagery will tend to adversely affect the ability of the required intra-window centroiding operation to focus on even a small object of interest. This type of clutter includes the situations where enclosed within the window at a given position are either more than one small target or portions of larger objects in addition to an object of interest.

A second set of countervailing considerations is related to the processing capabilities of the hardware system which would typically be utilized to practice the inventive method in an actual operational environment. The desire to minimize execution times or computational storage requirements may provide another group of factors which limit window size as a consequence of a desire to limit the amount of pixel data which may advantageously be included in each of the required centroiding calculations.

It is thus apparent that in many practical operational situations of interest, window dimensional optimization is simply a matter for empirical determination in light of not only the objects of interest and the nature of the scene to be viewed, but also of the equipment utilized for both image sensing and data analysis.

B. Scan Procedure

It has been generally stated that the practice of the inventive method requires that the processing window be step-wise scanned over the entire sensed image. This general scanning requirement may be more specifically stated in terms of a collection of M-by-N windowed pixel sets upon which the likewise-required centroiding is performed. The more-specifically-stated requirement, as applied within each one of whatever image sectors are to be examined for the presence of small objects, is that each possible M-by-N grouping of the given sector's pixels must be subjected to the centroiding operation.

One convenient procedure for fulfilling this requirement in a systematic fashion is to scan the window according to row-by-row increments, with a cross-scene column-by-column scan being performed along each row position. The mechanics of this scan procedure may be better understood with reference to FIG. 2. As explained previously, the solid-perimetered window designated $W_{jk}$ relates to the currently-processed 5-by-5 pixel set of the pixels from rows R6 through R10 and columns C13 through C17, with the indices "j" and "k" respectively designating in a general way the particular set of rows and columns of that window. Once the $W_{jk}$ pixel set has been centroided, according to the procedures to be more fully described below, the pixel set of the window $W_{j(k+1)}$ is then processed. In other words, with the row group being held constant, the window is right-shifted by one column, with the R6 through R10 pixels of column 17 being utilized in the new centroiding computation in place of the R6 through R10 pixels of column 13. The single-column right-shift continues until the right edge of the scene is reached, at which point the processing is then carried on with a single-row down-shifted sequence of windows referenced with respect to the R7-through-R11 row set. $W_{(j+1)k}$, with its incremented row index (j+1), shows the row-incremented window as it once again moves into the vicinity of the small target 130.

The shift sequence typically begins at the first available M-by-N cluster of pixels in the upper left corner of the image where the single-column right-shifting is performed across the entire scene with respect to the first available set of N rows. The processing then continues through the successive row-increment-plus-column-shift sequences until all of the M-by-N pixel clusters of all of the scene portions of interest have been centroided. It may be noted that in the typically-employed scan sequencing, the window is not allowed to overlap the edges of the scene. Near scene boundaries, therefore, the centroiding is thus typically performed only with respect to window positions in which a full complement of M-by-N pixels is available.

C. Centroiding Details

As utilized in the image-analysis context of this invention, the conventional mathematical operation of centroiding becomes a determination of that point within each window position which may be regarded as being in the nature of an effective center of the image intensities enclosed by the given window. In the practice of the invention, this effective center is not only very useful in terms of the net results achieved by the invention itself, but is also especially expedient in facilitating the achievement of these results. The centroid's usefulness is apparent in those operational environments where a principal processing objective is the ascertainment, for each small object in the sensed scene, of a single pixel which may be taken as being representative of the intra-image location of that object. The centroid's expediency follows from a consequential property which contributes significantly to the conceptual basis of the inventive method. This property is the tendency of the centroid of those objects which are significantly smaller than the window size, as distinguished from those whose size is of the same order as or larger than the window, to remain stationary while the window is being moved through a sequential plurality of step-wise-incremented positions. It is this stationarity property, further clarified in examples to be presented below, which is a major factor in bringing about the accumulation effect used as the final indicator of the possible presence and resulting location of any small point object in the scene.

As is readily-apparent from the standard-form centroiding equations presented below, and as is to be expected in the performance of a mathematical operation whose purpose is to ascertain an effective image-intensity center, the centroid calculation requires as inputs two quantities for each pixel:

(1) a measure of the pixel's displacement with respect to some frame of reference, and (2) an indicator of image intensity within the given pixel.

It has been found that because of several unique characteristics of certain image-processing environments in which the invention may be practiced, measures and indicators of a specially-adapted nature yield preferred inventive performance. In order to facilitate a clearer understanding of the manner in which the conventional centroiding equations are typically utilized in the practice of the present invention with respect to these particularized environments, the specially-adapted form of both the displacement measures and the image-intensity indicators will now be examined prior to the formal presentation below of the operationally-utilized centroiding equations themselves.

1. Centroiding Frame of Reference

In the practice of the present invention, it may readily be demonstrated that the frame of reference used for centroiding-related displacement measurements is arbitrary as long as there is reference-frame consistency from one centroid computation to the next and hence from one window position to the next. Simply employing a Cartesian coordinate system in which the row and column designators become the respective (x,y) units of displacement measurement is both sufficient and straightforward. However, in various processing situations where hardware economies and computational efficiencies are of significant concern, it has been found preferable to provide the processing window with a localized Cartesian system which is carried along with the window throughout its scene scan.

Window $W_{jk}$ of FIG. 2 may thus be seen to contain a coordinate system of this nature. For illustrative convenience, the lower left-hand corner is designated the origin. The ordinal designators of the 1st through Mth columns and 1st through Nth rows become respectively the x and y units which are to be used in the associated centroid calculation.

It may be noted that because the window position is always known, it is always possible to transform a locally-determined centroid into a centroid which is properly positioned with respect to a more-general row-and-column-referenced coordinate system. Thus once again with respect to the FIG. 2 situation, pixel {R11, C12} may be regarded as an origin for window $W_{jk}$. As it may be demonstrated that the localized coordinates of this window's image-data centroid are at $x=4$ and $y=2$, the global coordinates and hence intra-image row and column designations could be obtained by a simple alteration of the row and column designators of the origin pixel according to the respective local y and x values. Thus, subtracting $y=2$ from R11 while adding $x=4$ to C12 yields {R9, C16} as the correct global centroid location for the $W_{jk}$ image data.

2. Image-Intensity Normalization

In addition to the utilization of specially-adapted displacement measures, the centroid calculations in a specialized class of operating environments also typically employ image-intensities which are adjusted so as to cause the computational results to become more-meaningful representations of the associated windows' intensity centers. The need for the intensity adjustments is a consequence of an operationally-adverse interaction between, on one hand, the nature of the centroid calculations themselves and, on the other, the nature of the image data presented for inventive processing in these specialized operational situations.

A particular problem situation often presented is that in which a desired small object, by itself yielding a sensed image intensity of a given level, is observed while effectively superimposed on a field-of-view background having its own, nonzero image-intensity level. When this is the case, the background is said to form a "pedestal" upon which the object rests. With respect to such situations, it may readily be demonstrated that there is a computational tendency for the small object to become in a sense "obscured" by its background and for the resulting inventive processing to be less effective in ascertaining if not the presence of such an object, then at least its true image centroid. It was determined to be of considerable benefit, therefore, to subject the sensed scene in its "raw" form to a type of pre-processing designed in its basic effect to remove the pedestals by reducing any extensive, nonzero backgrounds to a zero intensity level. Within the context of this invention, this background-reduction process will be given the generic designation of image-data normalization.

It may be further noted that in those situations where the intensity of the background is not only nonzero but also not significantly different from that of a given, superimposed small object, it may be advantageous to either disregard such noncontrasting targets by thresholding the de-pedestalled image data or artificially intensifying them by means of a post-pedestal-removal image enhancement.

Several techniques have been devised to perform the data-normalizing pedestal removal. Before describing these techniques in greater detail, some general comments will be made concerning the basic approach to data-normalization in accordance with which the techniques were formulated.

In general, the process of pedestal removal by reducing background intensity to zero is typically achieved in a relatively simple manner by determining an average intensity value within a given area and then reducing all "raw" intensity values within that area by this determined average amount. With respect to the windowing typically performed in the practice of this invention, where the centroiding is carried out only with respect to a localized group of pixels, it becomes apparent, once the need for pedestal-removal is recognized, that the removal must be done on a basis which is localized to the particular cluster of pixels which are being analyzed for the presence of small objects and hence which are included in a given centroiding computation. Thus the averaging by which background reduction is typically achieved should, for the purposes of optimizing inventive performance, be performed on the basis of only those intensity values which are sensed in the immediate vicinity of a given subject pixel. In recognition of these characteristics of the processing situation at hand, the pedestal removal and hence average-level determination is performed on a windowed set of pixels.

Two actual pedestal-removal techniques will be described further. It will become apparent that both effectuate the basic processing goal of data-normalizing pedestal-removal, just as it will become apparent that both ultimately perform this pedestal removal on a localized, windowed-pixel-set basis. However, although in a general sense it will in addition become apparent that both also share the processing-cycle characteristic of being applied prior to the point at which the image-intensity values are included in the actual centroid computations, the techniques are nevertheless distinguishable in significant part on the basis of more precisely where in the image-processing cycle they are utilized. In one of the techniques, the pedestal removal is done at the time each centroiding window is formed and hence on a separate and individual basis immediately prior to each centroiding calculation. In the other of the techniques, the pedestal removal is carried out with respect to all of the subject pixels prior to any scene centroiding. The centroiding calculations which then follow are performed with respect an entire scene of de-pedestalled data.

Thus, in its specifics, the centroid-by-centroid process of the first pedestal-removal technique involves the following: Each time the basic processing window is incremented to a new position and thus encloses a new set of pixels, the actual centroid calculation itself is not performed until a determination has been made of what is the average intensity level of all of the applied "raw" levels of each of the pixels in that given set. In a centroid-calculation memory, the "raw" intensity value of each pixel is reduced by the determined average. (It may be noted that the presented image values of the pixels enclosed by the window in its given position are themselves left unaltered for the sake of the averaging calculations which are then subsequently performed when the centroiding window shifts to its next succeeding position.) The centroid calculation for that one window then proceeds on the basis of the reduced intensity values. Once that window's centroiding is completed, the window is shifted to enclose a new set of pixels where the centroiding operation is again preceded by an associated average-level determination performed with respect to applied intensity values only.

In turning to the specifics of the second of the pedestal-removal techniques, it should be noted at the outset that the primary motivations for the development and utilization of this technique, in its to-be-specified form, were hardware economy and processing efficiency. It should be noted in addition that although this particular technique will be designated the preferred procedure, the technique is preferred simply because, in one operational situation where the objectives of hardware economy and processing efficiency were controlling considerations, the technique provided a means of readily achieving these goals given inherent limitations of the processing environment and the equipment available.

Figure 3:
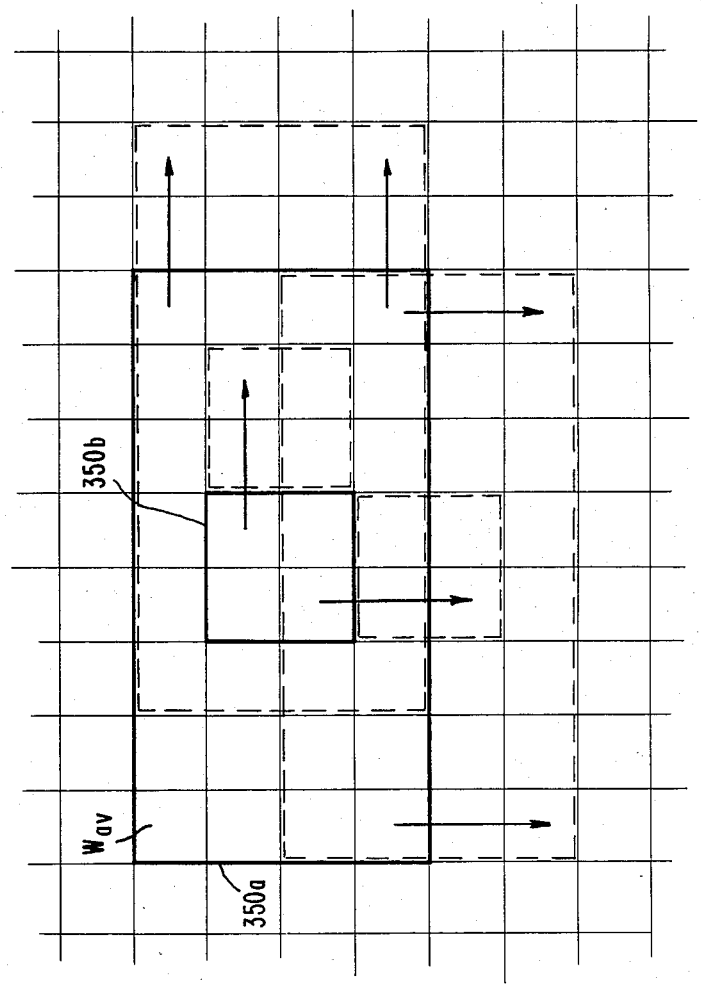
In FIG. 3 is presented the structure and double-pixel scan procedure of a filtering window used for background elimination.

Thus, in the one operational situation where this second technique was actually implemented, the dual aims of hardware economy and processing efficiency proved to be most readily facilitated by the use of an averaging window possessing a format the same as that of the averaging window $W_{av}$ which appears in FIG. 3. $W_{av}$ is seen to be eight pixels in width and four pixels in height, while generally being composed of an outer averaging window 350a and an inner image-reduction window 350b.

The averaging window was and may be utilized as follows with respect to an actual image: The window is step-wise scanned over the entire image of interest in a manner similar to that in which the basic centroiding window is scanned over the scene. In the interests of processing efficiency, however, acceptable intensity-reduction performance is achieved by moving the window in increments of two columns and then two rows at a time, instead of the single-unit increments utilized for centroiding. At each window position, the average level of all the applied intensity data values for the thirty-two pixels enclosed by outer window 350a is determined. The intensity values which result from the process of subtracting this determined average from the "raw" intensity values of each of the four pixels enclosed by the inner window 350b are then stored in a working array having storage positions equal in number to, and uniquely corresponding to, those of the image array. In a manner analogous to that of the first of the pedestal-removal techniques, the presented image values of the pixels enclosed by the inner window are themselves left unaltered for the sake of the averaging calculations which are then subsequently performed when the averaging window shifts to its next succeeding position. The rationale for the double-column and double-row steps of the outer window is apparent from the four-pixel nature of the inner window.

Once the entire "raw" image is averaged and reduced in this fashion, the basic centroiding itself is then performed by scanning the centroiding window over the reduced image now held in the working storage. It may be seen that when pre-centroiding pedestal-removal is performed in this fashion, the nonreduced image values of those pixels near the periphery of the original image are ignored in the ultimate centroiding operation.

3. Centroid Equations

The mathematical equations utilized to carry out the centroiding operations may typically take the following conventional forms:

$$\overline{X}_l = \frac{\Sigma I_r x_r}{\Sigma I_r}$$

$$\overline{Y}_l = \frac{\Sigma I_r y_r}{\Sigma I_r}$$

In these equations:
(a) the indicated summations are performed over all pixels of that set which is currently enclosed by the centroiding window in a given position;
(b) $I_r$ = image intensity of the rth pixel of the enclosed set;
(c) $x_r$ = the rth pixel's horizontal displacement within the localized intra-window coordinate system explained above;
(d) $y_r$ = the vertical distance within the localized intra-window coordinate system;
(e) $\overline{X}_l$ = the localized intra-window horizontal location of the centroid pixel; and
(f) $\overline{Y}_l$ = the localized intra-window vertical location of the centroid pixel.

As mentioned previously, the local centroid designation $\{\overline{X}_l, \overline{Y}_l\}$ may then through well-known coordinate-transformation techniques be readily converted into a global row and column designation for that one, overall-scene pixel which has been determined in this fashion to be the centroid of the data currently contained within the window.

In those specialized imaging situations where the data may be expected to occur superimposed on pedestals as described above, the $I_r$ quantity may be more precisely defined in terms of the two pedestal-removal techniques as follows:

(1) Where the first, individualized pedestal-removal technique is utilized, $I_r$ may typically be obtained through the following relations:

$$I_r = \max[(I_{rq} - \mu), 0]$$

where (a) $\max[a, b]$ = "maximum-of" function
    = $a$ when $a \geq b$
    = $b$ when $a < b$ (b) $I_{rq}$ = sensed, raw image intensity at the rth pixel; and
(c) $\mu$ = the average intensity level computed at the given window position.

It may be seen, especially in view of the principal desire to reduce the background intensity to zero, that it is sufficient to assign $I_r$ the value 0 when the quantity $(I_{rq} - \mu)$ yields a negative value.

(2) When the second, globally-executed pedestal-reduction technique is used, $I_r$ is simply the reduced intensity value obtained from the appropriate position of the working storage array. It may be noted that in the performance of this reduction, a zero-thresholding "maximum-of" function, described above and also incorporated in the example subroutine HIGHPASS presented below, would typically be employed.

4. Sensor Independence

It may be observed that if every intensity value in a given image is multiplied by some constant K and/or increased or decreased through the addition of some constant K, the centroiding calculation (together with any pedestal removal) will be unaffected. An important consequential property of the invention is that the detection and location of small objects may be achieved without having to know the gain or DC offset of the sensor which produced the image.

D. Centroid-Count Accumulation

As indicated previously, the net outcome of each of the centroiding calculations is an incrementing of a centroid count for that intra-scene pixel determined to coincide with the current intra-window centroid. After the completion of all of the given scene's centroiding operations, the conventional accumulation array utilized for holding the resulting pixel-by-pixel centroid counts as finally incremented may be interrogated by means of various memory-inventory techniques. Because smaller objects will tend to have given rise to the larger of such centroid counts, the pixels corresponding to those accumulation-array storage positions found during the course of the interrogation to have high counts will in accordance with the invention be deemed to be the intra-scene locations of small point targets.

E. Centroid-Count Interrogation

Accumulation-array interrogation is the process of examining the array's tabulated contents for those high centroid counts which indicate the presence of a small object at the associated pixel. Among the effectively-equivalent specific procedures which may be utilized to carry out this interrogation process are what will be designated as peak-count detection and count thresholding.

In peak-count detection the accumulation array is simply checked to see which of its tabulated centroid counts is the highest. The associated pixel is then designated as being the intra-scene location of a small target. To ascertain the presence of any additional small targets within the given scene, the peak detection may be performed iteratively by first, reducing to zero the count of the array position having the first-detected peak; second, re-examining the array contents for a second peak; third, location-designating the second-detected peak; and then repeating the peak-nullification, contents-re-examination and location-designation sequence.

As its name implies, count-thresholding is the related interrogation procedure in which the accumulation array is checked not for that one count which is higher than the rest but for those counts which are higher than some threshold. This procedure follows from the observation that, in many operational situations of interest, desired small targets will tend to give rise to centroid counts of at least a certain level. In such situations it may then be possible to establish a centroid-count threshold and to declare that whenever in the course of an accumulation-array interrogation a count is found to exceed this threshold, the count will be taken as an indication of the presence of a small target. It will at times also be possible to analogously ascertain an intermediate range of centroid counts which may be used as indicators of objects of intermediate size.

Such thresholds will typically tend to be quantities which can be determined on an empirical basis only and will be dependent upon the unique characteristics of the given processing situation at hand. Relevant considerations to be evaluated in setting the thresholds will include the size of the centroiding window, the expected size of the objects of interest, the expected concentration of objects, and the extent to which extraneous "clutter" may be expected to be enclosed along with an object of interest by the centroiding window in any one of its positions.

Consider, for example, the situation presented in FIG. 1 with respect to automobile 130 and centroiding window $W_x$. Given the window size of 5-by-5 (i.e., 25 pixels), and an object size of a single pixel, it will be apparent that as the window scans in the vicinity of this object, the car will be contained within the window for a total of 25 window positions. Furthermore, given the solitary location of this particular object and the clutter-free nature of the presented scene, it will also be apparent that pixel {R9, C16} will achieve a centroid count of a full 25. In an analogous fashion, the center pixel {R16, C13} of house 120 will be demonstrated to achieve a centroid count of 16. Thus, in situations where a 5-by-5 window is used with respect to single-pixel objects which tend to occur in clutter-free isolation, and where the next-largest object occupies a 9-pixel square, a count threshold of 20 may be sufficient for small-object-location purposes.

It may be noted that as between peak-detection and count-thresholding, the count-thresholding procedure has been found in some situations to be a more operationally-efficient means of realizing array interrogation.

III. Operational Example

A. Window Sequences

In each portion of FIG. 4 is presented 5 of the successive column-incremented window positions resulting when the 5-by-5 centroiding window $W_x$ of FIG. 1 scans, along the FIG.-1 designated row-groups "a," "b" and "c," in the vicinity of the three objects shown in scene 100. In sequence "a" it may be seen that the size characteristics of the factory are such that at each of its successive positions, the window is completely filled by the object. In a situation such as this, where the image intensity is taken to be uniform, the centroid of the image data contained within the window is the same as the center of the window itself. As the window moves, its center will, of course, move along with it. Consequentially, each member of the indicted sequence of pixels {R5, C4} through {R5, C8} will be coincident with the window center just once and hence will have its associated centroid count incremented only once.

An opposite situation is shown in sequence "b" where the single-pixel object 130 is entirely enclosed by the window at each of the 5 successive positions. With the only image data being that of a single-pixeled object, the windowed-data centroid is simply the pixel in which that object is located. Pixel {R9, C16} will, therefore, in all 5 window positions be ascertained to be the pixel which coincides with the centroid of the image data contained within the centroiding window. As a result, pixel {R9, C16} will have its centroid count incremented 5 times for this window sequence.

An intermediate situation is shown in sequence "c" where the intermediately-sized house 120 is seen to be completely contained within the window in three of its successive positions while being only partially contained within the window in two of its positions. Thus, although {R16, C13} will be correctly ascertained as the centroid-coincident pixel 3 times, pixel {R16, C14} will be chosen twice.

It may be observed here that the double centroid count for the identified second pixel was obtained in part through the use of a processing convention in which that pixel to the right of and, if necessary, one row up from an ambiguous centroid location is deemed to be the centroid location in those situations where the strict results obtained by the centroiding calculations will place the centroid on a junction between adjacent pixels. Alternative but analogous ambiguity-resolution conventions are readily apparent. For example, in one actual realization the ambiguities took the form of fractional remainders following the divisions by $\Sigma I_r$. The preferred manner of dealing with such remainders was to simply truncate them. With the preferred, intra-window localized coordinate system being in that situation one in which the origin was at the upper-left corner of the window, the resolution-by-truncation caused that pixel which was to the left of and, if necessary, above the true centroid position to be deemed the centroid location.

B. Example Centroid Calculations

An actual centroid calculation will be performed in the context of the first of the window positions in the "c" sequence of FIG. 4. The specific situation examined will be that of window $_1W_x$. It is apparent that as a result of the simple, clutter-free nature of the example image, pedestal removal will not be necessary.

FIG. 5 presents this situation in expanded form. Identifying the enclosed pixels from left to right beginning at the upper left corner, and letting all image-intensity values be unity, yields the following relations:

(a)
$I_1$ through $I_{10} = 0$
$I_{11} = I_{12} = I_{16} = I_{17} = I_{21} = I_{22} = 0$
$I_{13} = I_{14} = I_{15} = 1$
$I_{18} = I_{19} = I_{20} = 1$
$I_{23} = I_{24} = I_{25} = 1$ (b)
$x_{13} = x_{18} = x_{23} = 3$
$x_{14} = x_{19} = x_{24} = 4$
$x_{15} = x_{20} = x_{25} = 5$ (c)
$y_{13} = y_{14} = y_{15} = 3$
$y_{18} = y_{19} = y_{20} = 2$
$y_{23} = y_{24} = y_{25} = 1$ (d) $\Sigma I_r = 9$ (e) $\overline{X} = \dfrac{\Sigma I_r x_r}{\Sigma I_r} = \dfrac{\Sigma x_r}{9} = \dfrac{9 + 12 + 15}{9} = \dfrac{36}{9} = 4$ (f) $\overline{Y} = \dfrac{\Sigma I_r y_r}{\Sigma I_r} = \dfrac{\Sigma y_r}{9} = \dfrac{9 + 6 + 3}{9} = \dfrac{18}{9} = 2$ Thus, $\overline{X}_l = 4$ and $\overline{Y}_l = 2$, which may be seen to coincide with the center of house 120 and which may further be seen to be transformable into a final centroid pixel designation of {R16, C13}.

C. Example Tabulation

The following Table presents the complete results of utilizing a 5-by-5 centroiding window to perform the inventive method upon the example image of scene 100. (The above-noted right-and-up convention regarding pixel selection in cases of ambiguous centroids is incorporated into these results.)

TABLE I

| | | | | |
|---|---|---|---|---|
| {R1,C01} - 0 | {R2,C01} - 0 | {R3,C01} - 0 | {R4,C01} - 0 | {R5,C01} - 0 |
| {R1,C02} - 0 | {R2,C02} - 0 | {R3,C02} - 0 | {R4,C02} - 0 | {R5,C02} - 0 |
| {R1,C03} - 0 | {R2,C03} - 0 | {R3,C03} - 0 | {R4,C03} - 0 | {R5,C03} - 0 |
| {R1,C04} - 0 | {R2,C04} - 0 | {R3,C04} - 2 | {R4,C04} - 2 | {R5,C04} - 2 |
| {R1,C05} - 0 | {R2,C05} - 0 | {R3,C05} - 1 | {R4,C05} - 1 | {R5,C05} - 1 |
| {R1,C06} - 0 | {R2,C06} - 0 | {R3,C06} - 1 | {R4,C06} - 1 | {R5,C06} - 1 |
| {R1,C07} - 0 | {R2,C07} - 0 | {R3,C07} - 1 | {R4,C07} - 1 | {R5,C07} - 1 |
| {R1,C08} - 0 | {R2,C08} - 0 | {R3,C08} - 1 | {R4,C08} - 1 | {R5,C08} - 1 |
| {R1,C09} - 0 | {R2,C09} - 0 | {R3,C09} - 2 | {R4,C09} - 2 | {R5,C09} - 2 |
| {R1,C10} - 0 | {R2,C10} - 0 | {R3,C10} - 2 | {R4,C10} - 2 | {R5,C10} - 2 |
| {R1,C11} - 0 | {R2,C11} - 0 | {R3,C11} - 0 | {R4,C11} - 0 | {R5,C11} - 0 |
| {R1,C12} - 0 | {R2,C12} - 0 | {R3,C12} - 0 | {R4,C12} - 0 | {R5,C12} - 0 |
| {R1,C13} - 0 | {R2,C13} - 0 | {R3,C13} - 0 | {R4,C13} - 0 | {R5,C13} - 0 |
| {R1,C14} - 0 | {R2,C14} - 0 | {R3,C14} - 0 | {R4,C14} - 0 | {R5,C14} - 0 |
| {R1,C15} - 0 | {R2,C15} - 0 | {R3,C15} - 0 | {R4,C15} - 0 | {R5,C15} - 0 |
| {R1,C16} - 0 | {R2,C16} - 0 | {R3,C16} - 0 | {R4,C16} - 0 | {R5,C16} - 0 |
| {R1,C17} - 0 | {R2,C17} - 0 | {R3,C17} - 0 | {R4,C17} - 0 | {R5,C17} - 0 |
| {R1,C18} - 0 | {R2,C18} - 0 | {R3,C18} - 0 | {R4,C18} - 0 | {R5,C18} - 0 |
| {R1,C19} - 0 | {R2,C19} - 0 | {R3,C19} - 0 | {R4,C19} - 0 | {R5,C19} - 0 |
| {R1,C20} - 0 | {R2,C20} - 0 | {R3,C20} - 0 | {R4,C20} - 0 | {R5,C20} - 0 |
| {R6,C01} - 0 | {R7,C01} - 0 | {R8,C01} - 0 | {R9,C01} - 0 | {R10,C01} - 0 |
| {R6,C02} - 0 | {R7,C02} - 0 | {R8,C02} - 0 | {R9,C02} - 0 | {R10,C02} - 0 |
| {R6,C03} - 0 | {R7,C03} - 0 | {R8,C03} - 0 | {R9,C03} - 0 | {R10,C03} - 0 |
| {R6,C04} - 4 | {R7,C04} - 4 | {R8,C04} - 2 | {R9,C04} - 0 | {R10,C04} - 0 |
| {R6,C05} - 2 | {R7,C05} - 2 | {R8,C05} - 1 | {R9,C05} - 0 | {R10,C05} - 0 |
| {R6,C06} - 2 | {R7,C06} - 2 | {R8,C06} - 1 | {R9,C06} - 0 | {R10,C06} - 0 |
| {R6,C07} - 2 | {R7,C07} - 2 | {R8,C07} - 1 | {R9,C07} - 0 | {R10,C07} - 0 |
| {R6,C08} - 2 | {R7,C08} - 2 | {R8,C08} - 1 | {R9,C08} - 0 | {R10,C08} - 0 |
| {R6,C09} - 4 | {R7,C09} - 4 | {R8,C09} - 2 | {R9,C09} - 0 | {R10,C09} - 0 |
| {R6,C10} - 4 | {R7,C10} - 4 | {R8,C10} - 2 | {R9,C10} - 0 | {R10,C10} - 0 |
| {R6,C11} - 0 | {R7,C11} - 0 | {R8,C11} - 0 | {R9,C11} - 0 | {R10,C11} - 0 |
| {R6,C12} - 0 | {R7,C12} - 0 | {R8,C12} - 0 | {R9,C12} - 0 | {R10,C12} - 0 |
| {R6,C13} - 0 | {R7,C13} - 0 | {R8,C13} - 0 | {R9,C13} - 0 | {R10,C13} - 0 |
| {R6,C14} - 0 | {R7,C14} - 0 | {R8,C14} - 0 | {R9,C14} - 0 | {R10,C14} - 0 |
| {R6,C15} - 0 | {R7,C15} - 0 | {R8,C15} - 0 | {R9,C15} - 0 | {R10,C15} - 0 |
| {R6,C16} - 0 | {R7,C16} - 0 | {R8,C16} - 0 | {R9,C16} - 25 | {R10,C16} - 0 |
| {R6,C17} - 0 | {R7,C17} - 0 | {R8,C17} - 0 | {R9,C17} - 0 | {R10,C17} - 0 |
| {R6,C18} - 0 | {R7,C18} - 0 | {R8,C18} - 0 | {R9,C18} - 0 | {R10,C18} - 0 |
| {R6,C19} - 0 | {R7,C19} - 0 | {R8,C19} - 0 | {R9,C19} - 0 | {R10,C19} - 0 |

TABLE I-continued

| | | | | |
|---|---|---|---|---|
| {R6,C20} - 0 | {R7,C20} - 0 | {R8,C20} - 0 | {R9,C20} - 0 | {R10,C20} - 0 |
| {R11,C01} - 0 | {R12,C01} - 0 | {R13,C01} - 0 | {R14,C01} - 0 | {R15,C01} - 0 |
| {R11,C02} - 0 | {R12,C02} - 0 | {R13,C02} - 0 | {R14,C02} - 0 | {R15,C02} - 0 |
| {R11,C03} - 0 | {R12,C03} - 0 | {R13,C03} - 0 | {R14,C03} - 0 | {R15,C03} - 0 |
| {R11,C04} - 0 | {R12,C04} - 0 | {R13,C04} - 0 | {R14,C04} - 0 | {R15,C04} - 0 |
| {R11,C05} - 0 | {R12,C05} - 0 | {R13,C05} - 0 | {R14,C05} - 0 | {R15,C05} - 0 |
| {R11,C06} - 0 | {R12,C06} - 0 | {R13,C06} - 0 | {R14,C06} - 0 | {R15,C06} - 0 |
| {R11,C07} - 0 | {R12,C07} - 0 | {R13,C07} - 0 | {R14,C07} - 0 | {R15,C07} - 0 |
| {R11,C08} - 0 | {R12,C08} - 0 | {R13,C08} - 0 | {R14,C08} - 0 | {R15,C08} - 0 |
| {R11,C09} - 0 | {R12,C09} - 0 | {R13,C09} - 0 | {R14,C09} - 0 | {R15,C09} - 0 |
| {R11,C10} - 0 | {R12,C10} - 0 | {R13,C10} - 0 | {R14,C10} - 0 | {R15,C10} - 0 |
| {R11,C11} - 0 | {R12,C11} - 0 | {R13,C11} - 0 | {R14,C11} - 0 | {R15,C11} - 0 |
| {R11,C12} - 0 | {R12,C12} - 0 | {R13,C12} - 0 | {R14,C12} - 0 | {R15,C12} - 2 |
| {R11,C13} - 0 | {R12,C13} - 0 | {R13,C13} - 0 | {R14,C13} - 0 | {R15,C13} - 8 |
| {R11,C14} - 0 | {R12,C14} - 0 | {R13,C14} - 0 | {R14,C14} - 0 | {R15,C14} - 4 |
| {R11,C15} - 0 | {R12,C15} - 0 | {R13,C15} - 0 | {R14,C15} - 0 | {R15,C15} - 0 |
| {R11,C16} - 0 | {R12,C16} - 0 | {R13,C16} - 0 | {R14,C16} - 0 | {R15,C16} - 0 |
| {R11,C17} - 0 | {R12,C17} - 0 | {R13,C17} - 0 | {R14,C17} - 0 | {R15,C17} - 0 |
| {R11,C18} - 0 | {R12,C18} - 0 | {R13,C18} - 0 | {R14,C18} - 0 | {R15,C18} - 0 |
| {R11,C19} - 0 | {R12,C19} - 0 | {R13,C19} - 0 | {R14,C19} - 0 | {R15,C19} - 0 |
| {R11,C20} - 0 | {R12,C20} - 0 | {R13,C20} - 0 | {R14,C20} - 0 | {R15,C20} - 0 |
| {R16,C01} - 0 | {R17,C01} - 0 | {R18,C01} - 0 | {R19,C01} - 0 | {R20,C01} - 0 |
| {R16,C02} - 0 | {R17,C02} - 0 | {R18,C02} - 0 | {R19,C02} - 0 | {R20,C02} - 0 |
| {R16,C03} - 0 | {R17,C03} - 0 | {R18,C03} - 0 | {R19,C03} - 0 | {R20,C03} - 0 |
| {R16,C04} - 0 | {R17,C04} - 0 | {R18,C04} - 0 | {R19,C04} - 0 | {R20,C04} - 0 |
| {R16,C05} - 0 | {R17,C05} - 0 | {R18,C05} - 0 | {R19,C05} - 0 | {R20,C05} - 0 |
| {R16,C06} - 0 | {R17,C06} - 0 | {R18,C06} - 0 | {R19,C06} - 0 | {R20,C06} - 0 |
| {R16,C07} - 0 | {R17,C07} - 0 | {R18,C07} - 0 | {R19,C07} - 0 | {R20,C07} - 0 |
| {R16,C08} - 0 | {R17,C08} - 0 | {R18,C08} - 0 | {R19,C08} - 0 | {R20,C08} - 0 |
| {R16,C09} - 0 | {R17,C09} - 0 | {R18,C09} - 0 | {R19,C09} - 0 | {R20,C09} - 0 |
| {R16,C10} - 0 | {R17,C10} - 0 | {R18,C10} - 0 | {R19,C10} - 0 | {R20,C10} - 0 |
| {R16,C11} - 0 | {R17,C11} - 0 | {R18,C11} - 0 | {R19,C11} - 0 | {R20,C11} - 0 |
| {R16,C12} - 0 | {R17,C12} - 0 | {R18,C12} - 0 | {R19,C12} - 0 | {R20,C12} - 0 |
| {R16,C13} - 0 | {R17,C13} - 0 | {R18,C13} - 0 | {R19,C13} - 0 | {R20,C13} - 0 |
| {R16,C14} - 0 | {R17,C14} - 0 | {R18,C14} - 0 | {R19,C14} - 0 | {R20,C14} - 0 |
| {R16,C15} - 0 | {R17,C15} - 0 | {R18,C15} - 0 | {R19,C15} - 0 | {R20,C15} - 0 |
| {R16,C16} - 0 | {R17,C16} - 0 | {R18,C16} - 0 | {R19,C16} - 0 | {R20,C16} - 0 |
| {R16,C17} - 0 | {R17,C17} - 0 | {R18,C17} - 0 | {R19,C17} - 0 | {R20,C17} - 0 |
| {R16,C18} - 0 | {R17,C18} - 0 | {R18,C18} - 0 | {R19,C18} - 0 | {R20,C18} - 0 |
| {R16,C19} - 0 | {R17,C19} - 0 | {R18,C19} - 0 | {R19,C19} - 0 | {R20,C19} - 0 |
| {R16,C20} - 0 | {R17,C20} - 0 | {R18,C20} - 0 | {R19,C20} - 0 | {R20,C20} - 0 |

IV. Operational Realization

Implementing the above-described inventive method in computer-program form is regarded as a relatively straightforward matter well within the ordinary skill of the art. Nevertheless, there is generally flow-charted in the principal portion of FIG. 6 and listed below the computer subroutine CENPROCESS which is a FORTRAN-language realization of the essential steps of the invention. Listed in addition are the FORTRAN subroutines PEAKDETECT and HIGHPASS, as well as an associated Executive routine. PEAKDETECT is a realization of the centroid-count interrogation process, while HIGHPASS performs pedestal removal in accordance with the second of the removal techniques described previously. The REFPOINTS output of the PEAKDETECT subroutine will be the determined locations of small targets. In an actual operational situation, these location designations would then be made available for further track processing.

It will be apparent that the listed routines were tailored in accordance with the requirements of a particular operational situation. It will similarly be apparent that the diverse constraints of the various alternative environments in which it is desired to practice the invention may necessitate program adaptations in order to achieve optimized operationality in those environments. It is to be understood, therefore, that the routines as set forth are merely exemplary.

EXECUTIVE ROUTINE

```
      IMPLICIT INTEGER (A-Z)
      INTEGER FLRVIDEO,CENFLR,FLTFLR
      INTEGER*4 NDIVOVRFLWS
      INTEGER REFPOINTS(16,2),SENPOINTS(16,2)
      REAL XOFFSET,YOFFSET
      VIRTUAL FLRVIDEO(180,120),CENFLR(180,120)
      VIRTUAL FLTFLR(180,120)
C
C     RUN ALGORITHM
C
C     THE ROUTINE PUTCOR TRANSFERS THE FILE
C     'SEN.IMG' (WHICH CONTAINS THE SENSED
C     IMAGE) INTO AN ARRAY IN CORE (FLRVIDEO)
      AND RETURNS THE SIZE OF THE IMAGE
      CALL PUTCOR('SEN.IMG',FLRVIDEO,W,L)
C     W = NUM. OF PIXELS/LINE IN SENSED IMAGE
C
C     L = NUM. OF LINES IN SENSED IMAGE
C
C     REMOVE PEDESTALS
      CALL HIGHPASS(FLRVIDEO,W,L,FLTFLR)
C     SCAN WINDOW, COMPUTE CENTROIDS,
      ACCUMULATE COUNTS
      CALL CENPROCESS(FLTFLR,W,L,CENFLR)
C     INTERROGATE ACCUMULATION ARRAY
      CALL PEAKDETECT(CENFLR,W,L,REFPOINTS,
      NUMPKS)
C
C     REFPOINTS = INPUT TO FURTHER TRACK
      PROCESSING
C
      STOP
      END
```

HIGHPASS FILTER SUBROUTINE
SUBROUTINE HIGHPASS(IMGVIDEO,W,L,FLTVIDEO)

```
C
      IMPLICIT INTEGER(A-Z)
      INTEGER BOX(8,4)
      INTEGER IMGVIDEO,FLTVIDEO
      VIRTUAL IMGVIDEO(W,L),FLTVIDEO(W,L)
C
      COMMON /INDX/ XSTART,XSTOP,YSTART,YSTOP
      COMMON /HBOX/ XBOXSIZ,YBOXSIZ
C
      XBOXSIZ=8     ! HIGHPASS FILTER BOX SIZE,
                    ! HORIZONTAL DIMENSION.
      YBOXSIZ=4     ! HIGHPASS FILTER BOX SIZE,
                    ! VERTICAL DIMENSION.
C
C     HIGHPASS FILTER THE IMAGE VIDEO
C
C     CLEAR FILTERED IMAGE ARRAY
C
      DO 1 J=1,L
      DO 1 I=1,W
    1 FLTVIDEO(I,J)=0
C
C     DETERMINE START AND STOP FILTER BOX
C     INDEX POSITIONS
C
      XSTART=0
      N=(W-XBOXSIZ)/2
      XSTOP=XSTART+2*N
      YSTART=0
      N=(L-YBOXSIZ)/2
      YSTOP=YSTART+2*N
C
C     PASS FILTER BOX OVER IMAGE
C     (FOR THIS PARTICULAR HIGHPASS FILTER, THE
C     BOX IS MOVED TWO PIXELS AT A TIME)
C
      DO 100 YINDEX=YSTART,YSTOP,2
      DO 100 XINDEX=YSTART,XSTOP,2
C
C     FILL FILTER BOX WITH IMAGE DATA
C
      DO 5 J=1,YBOXSIZ
      DO 5 I=1,XBOXSIZ
C
      LEVEL=IMGVIDEO(I+XINDEX,J+YINDEX)
      BOX(I,J)=LEVEL
    5 CONTINUE
C
C     COMPUTE PEDESTAL LEVEL
C
      BAKGRND=        ! FUNCTION PEDESTAL
      PEDESTAL(BOX)   ! CALCULATES THE AVERAGE
                      ! OF THE NUMBERS STORED IN
                      ! THE BOX ARRAY.
C     SUBTRACT THE PEDESTAL LEVEL FROM THE
C     CENTER 4 PIXELS OF THE FILTER BOX
C
      DO 10 J=YINDEX+2,YINDEX+3
      DO 10 I=XINDEX+4,XINDEX+5
C
      LEVEL=IMGVIDEO(I,J)
      DIFF=LEVEL-BAKGRND
      IF(DIFF.LT.0) GO TO 10    ! IGNORE NEGATIVE
                                ! FILTER OUTPUTS.
      FLTVIDEO(I,J)=DIFF        ! STORE FILTER OUT-
                                ! PUT IN FLTVIDEO
C                               ! ARRAY.
   10 CONTINUE
C
  100 CONTINUE
C
      RETURN
      END
```

CALCULATION OF AVERAGE

```
C
```

CALCULATION OF AVERAGE
FUNCTION PEDESTAL(BOX)

```
C
      IMPLICIT INTEGER (A-Z)
      INTEGER*4 SUM
C
      COMMON /HBOX/ XBOXSIZ,YBOXSIZ
C
      SUM=0
C
      DO 10 J=1,YBOXSIZ
      DO 10 I=1,XBOXSIZ
   10 SUM=SUM+BOX(I,J)
C
      PEDESTAL=SUM/(XBOXSIZ+YBOXSIZ)
C
      RETURN
      END
```

CENTROID PROCESSOR SUBROUTINE
SUBROUTINE CENPROCESS(IMGVIDEO,W,L,CENVIDEO)

```
C
      IMPLICIT INTEGER (A-Z)
      INTERGER*4 SUMP,SUMI,SUMJ,SUMT
      INTEGER IMGVIDEO,CENVIDEO
      VIRTUAL IMGVIDEO(W,L),CENVIDEO(W,L)
C
      COMMON /INDX/ XSTART,XSTOP,YSTART,YSTOP
      COMMON /HBOX/ XBOXSIZ,YBOXSIZ
      XWNDOSIZ=8    ! CENTROID WINDOW SIZE,
                    ! HORIZONTAL DIMENSION.
      YWNDOSIZ=8    ! CENTROID WINDOW SIZE,
                    ! VERTICAL DIMENSION.
C
C     CENTROID PROCESS THE IMAGE VIDEO
C
C     CLEAR CENTROID ACCUMULATION ARRAY
      DO 1 J=1,L
      DO 1 I=1,W
    1 CENVIDEO(I,J)=0
C
C     DETERMINE START AND STOP CENTROID
C     WINDOW INDEX POSITIONS
C
      XHLOSS=(XBOXSIZ-2)/2
      XSTART=XSTART+XHLOSS
      XSTOP=XSTOP+XBOXSIZ-XHLOSS-XWNDOSIZ
      YHLOSS=(YBOXSIZ-2)/2
      YSTART=YSTART+YHLOSS
      YSTOP=YSTOP+YBOXSIZ-YHLOSS-YWNDOSIZ
C
C
C
C     MOVE CENTROID WINDOW OVER IMAGE
C
      DO 100 YINDEX=YSTART,YSTOP
C
      DO 100 XINDEX=XSTART,XSTOP
C
C     COMPUTE X CENTROID
C
      SUMP=0
      SUMT=0
C
      DO 20 I=1,XWNDOSIZ
C
      SUMI=0
      DO 10 J=1,YWNDOSIZ
      II=I+XINDEX
      JJ=J+YINDEX
      MASS=IMGVIDEO(II,JJ)
   10 SUMI=SUMI+MASS
C
      SUMT=SUMI+SUMT     ! SUM PIXEL INTENSITIES
                         ! WITHIN WINDOW.
   20 SUMP=SUMP+SUMI*(I-1)  ! SUM PRODUCTS OF
                            ! PIXEL INTENSITIES
```

```
                     -continued
           CENTROID PROCESSOR SUBROUTINE
                      SUBROUTINE
            CENPROCESS(IMGVIDEO,W,L,CENVIDEO)
C                               ! AND POSITIONS
                                  WITHIN WINDOW.
C
        IF(SUMT.LE.0) GO TO 100
C
C       CALCULATE X CENTROID RELTIVE TO UPPER
C       LEFT HAND CORNER OF IMAGE
        XBAR=(SUMP/SUMT)+XINDEX +1
C
C       COMPUTE Y CENTROID
C
        SUMP=0
C
        DO 50 J=1,YWNDOSIZ
        SUMJ=0
C
        DO 40 I=1,XWNDOSIZ
        II=I+XINDEX
        JJ=J+YINDEX
        MASS=IMGVIDEO(II,JJ)
40      SUMJ=SUMJ+MASS
C
50      SUMP=SUMP+SUMJ*(J−1)
C
C       CALCULATE Y CENTROID RELATIVE TO UPPER
C       LEFT HAND CORNER OF IMAGE
        YBAR=(SUMP/SUMT)+YINDEX +1
C
C       INCREMENT CENTROID ACCUMULATION ARRAY
C
        CENVIDEO(XBAR,YBAR)=CENVIDEO(XBAR,
        YBAR)+1
100     CONTINUE
C
        RETURN
        END
```

```
              PEAK DETECT SUBROUTINE
                    SUBROUTINE
          PEAKDETECT(CENVIDEO,W,L,POINTS,NPTS)
C
        PARAMETER X=1,Y=2,V=3
        IMPLICIT INTEGER (A-Z)
        INTEGER CENVIDEO
        INTEGER POINTS(MAXNPTS,3),XLOC(MAXNPTS)
        INTEGER YLOC(MAXNPTS),PEAK(MAXNPTS)
        VIRTUAL CENVIDEO(W,L)
C
        COMMON /INDX/ XSTART,XSTOP,YSTART,YSTOP
        COMMON /PKDT/ MINPEAK
        COMMON /CWIN/ XWNDOSIZ,YWNDOSIZ
C
C       LOCATE PEAKS IN CENTROID PROCESSED
        IMAGE
C
        NPTS=0
        AMPTHRSH=  ! MINPEAK=MINIMUM ACCEP-
        MINPEAK−1  ! TABLE CENTROID COUNT.
C
        DO 400 INDX=1,MAXNPTS
C       SET PEAK VALUE TO (MINUMUM−1)
        PEAKVAL=AMPTHRSH
C
C       STEP THROUGH ALL PIXELS IN CENTROID
        IMAGE
        DO 200 J=(YSTART+1),(YSTOP+YWNDOSIZ)
        DO 300 I=(XSTART+1),(XSTOP+XWNDOSIZ)
C
C       SET COUNT VALUE
        COUNT=CENVIDEO(I,J)
C       IF COUNT IS BELOW MINIMUM ACCEPTABLE
C       VALUE OR BELOW CURRENT VALUE STORED
        IF(COUNT.LE.PEAKVAL) GO TO 300
C       STORE PEAK COUNT
        XLOC(INDX)=I
```

```
                     -continued
              PEAK DETECT SUBROUTINE
                    SUBROUTINE
          PEAKDETECT(CENVIDEO,W,L,POINTS,NPTS)
        YLOC(INDX)=J
        PEAK(INDX)=COUNT
        PEAKVAL=COUNT
300     CONTINUE
C
200     CONTINUE
C       IF PEAK COUNT NOT ABOVE THRESHOLD
        IF(PEAKVAL.EQ.AMPTHRSH) GO TO 450
C       INCREMENT NUMBER OF PEAKS FOUND
        NPTS=NPTS+1
C       CLEAR CURRENT PEAK FROM CENTROID ARRAY
        CENVIDEO(XLOC(NPTS),YLOC(NPTS))=0
400     CONTINUE
C
450     IF(NPTS.EQ.0) RETURN
C
C       FOR ALL PEAKS FOUND
        DO 550 N=1,NPTS
C       LOAD POINTS ARRAY WITH PEAK INFORMATION
        POINTS(N,X)=XLOC(N)
        POINTS(N,Y)=YLOC(N)
        POINTS(N,V)=PEAK(N)
C       RESTORE CENVIDEO PEAK VALUES
        CENVIDEO(POINTS(N,X),POINTS(N,Y))=
        POINTS(N,V)
550     CONTINUE
C
        RETURN
        END
```

V. Claims

The preceding description has presented in detail merely exemplary preferred ways in which the inventive method may be practiced. It will be apparent to those skilled in the art that numerous other alternative techniques encompassing many variations may readily be employed without departing from the spirit and scope of the invention as set forth in the appended claims.

What is claimed is:

1. In a scene-sensing and imaging system having data-analysis apparatus which includes (a) an array for storing a given pixel-based scene image, (b) window gating networks associated with said image-storage array, and (c) an accumulation array, a method of operating said data-analysis apparatus so as to locate smaller-dimensioned objects in predetermined sectors of said given image, this method comprising the steps of:

(A) utilizing said gating networks both to establish at least one processing window dimensioned with respect to desired small objects in said scene, and then to read out of said image array each dimensioned-window grouping of pixels in said image sector;

(B) for each such dimensioned-window pixel grouping, determining which pixel is the intra-window image centroid;

(C) utilizing said accumulation array to tabulate the number of times each pixel in said sector is determined to be a windowed-pixel centroid; and then (D) interrogating said accumulation array for a pixel having a high tabulated centroid account, with any such pixel being the location of smaller-demensioned objects in said scene.

2. A method according to claim 1 in which:
the dimensioned processing window is a rectangle covering M by N pixels, whereby intra-scene objects of dimension smaller than about M/2 by N/2 pixels tend to give rise to high tabulated centroid counts.

3. A method according to claim 1 in which the interrogation step includes the steps of:
   (1) determining which of the scene's pixels has the highest tabulated centroid count; and
   (2) designating this highest-count pixel as being the location within the scene of a smaller-dimensioned object.

4. A method according to claim 3 which includes, after the small-object, location-designation step, the steps of:
   (1) reducing the subject highest count to zero, and then
   (2) iteratively performing the sequence of highest-count determination, location-designation and highest-count reduction.

* * * * *